A. HUDSON.

LIFE GUARD FOR CARS AND OTHER VEHICLES.

APPLICATION FILED JULY 31, 1909.

Reissued Jan. 3, 1911.

13,192.

2 SHEETS—SHEET 1.

WITNESSES:

John W. Thompson

Edward E. Rack.

INVENTOR

Arthur Hudson

BY

Siddle Cowdell & Varney

ATTORNEYS

MORRIS PETERS, INC., LITHO., WASHINGTON, D. C.

A. HUDSON.

LIFE GUARD FOR CARS AND OTHER VEHICLES.

APPLICATION FILED JULY 31, 1909.

Reissued Jan. 3, 1911.

13,192.

2 SHEETS—SHEET 2.

WITNESSES:

John W. Thompson

Edward E. Racek

INVENTOR

Arthur Hudson

BY

Liddle Wendell & Varney

ATTORNEYS.

NORRIS PETERS, INC., LITHO., WASHINGTON, D. C.

UNITED STATES PATENT OFFICE.

ARTHUR HUDSON, OF TINSLEY PARK, NEAR SHEFFIELD, ENGLAND, ASSIGNOR TO HUDSON & BOWRING, LIMITED, OF MANCHESTER, ENGLAND, A CORPORATION OF GREAT BRITAIN.

LIFE-GUARD FOR CARS AND OTHER VEHICLES.

13,192. Specification of Reissued Letters Patent. Reissued Jan. 3, 1911.

Original No. 720,809, dated February 17, 1903, Serial No. 127,957. Application for reissue filed July 31, 1909. Serial No. 510,686.

*To all whom it may concern:*

Be it known that I, ARTHUR HUDSON, a subject of the King of Great Britain and Ireland, and a resident of Tinsley Park, near Sheffield, England, have invented certain new and useful Improvements in Life-Guards for Cars and other Vehicles, of which the following is a specification, reference being had to the accompanying drawings, forming a part hereof.

This invention relates to improvements in apparatus for preventing accidents and loss of life in connection with the operation of street railway cars, motor-cars, and other vehicles, such as traction-engines, propelled wagons, and the like.

The object of the invention is to provide a safe and reliable wheel guard of simple construction, of the type in which the cradle or wheel guard proper is normally held up from the track and is provided with a tripping gate hung in front of the same for the purpose of throwing the guard down upon the track when an obstruction is encountered.

Figure 1:
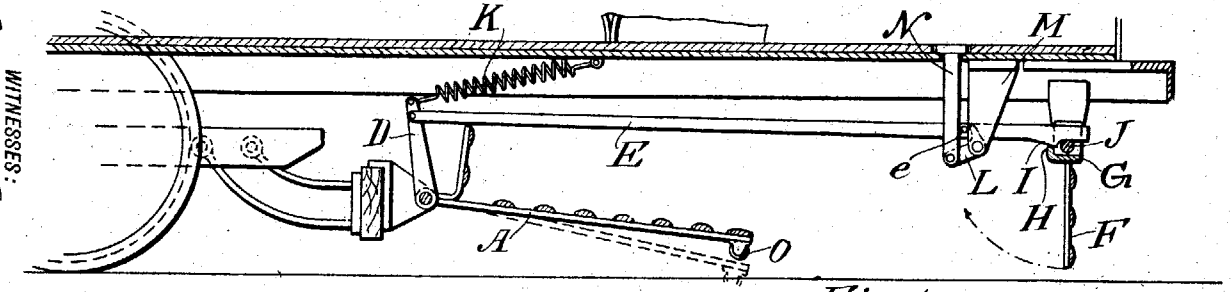
Figure 2:
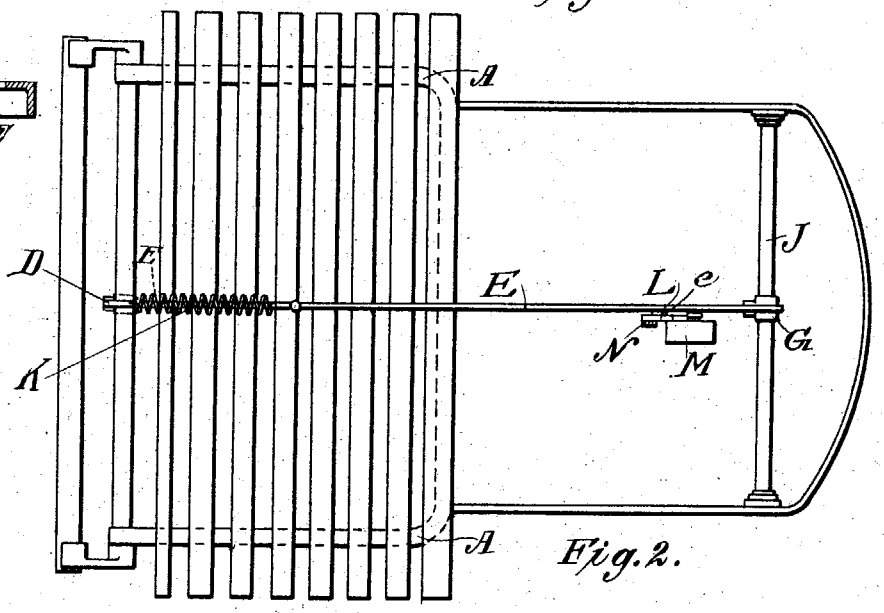
Figure 3:
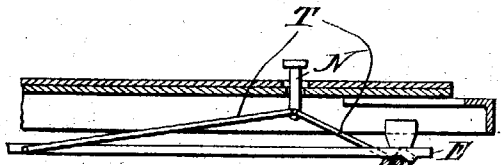
Figure 3:
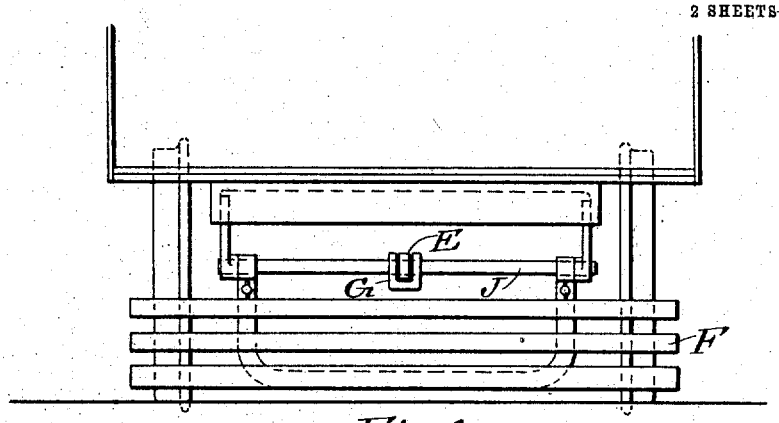
Figure 4:
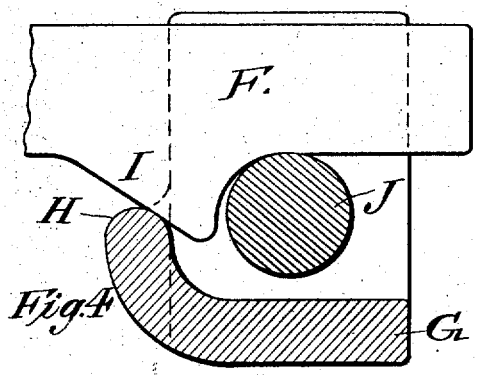
Figure 5:
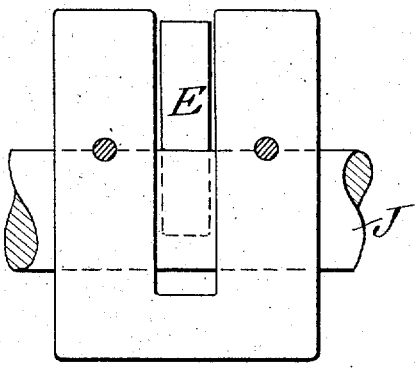
Figure 6:
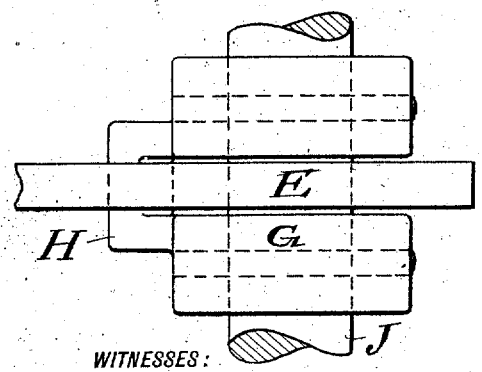

In the drawings, where one embodiment of the invention is illustrated, Figure 1 is a sectional elevation, Fig. 2 a plan, and Fig. 3 a front elevation of the improved life-guard as applied to a street railway car. Figs. 4, 5 and 6 illustrate details on a large scale. Fig. 7 is a detail view of a portion of the mechanism shown in Fig. 1, illustrating a preferred form of the improvements.

The cradle or guard proper indicated at A, is pivoted, in the present case, to one of the car trucks and is operatively connected with the gate, indicated at F, through an upwardly extending arm D rigidly secured to the shaft of the cradle and a horizontally disposed rod E pivoted upon the end of the arm D. The rod E, when the cradle is held up from the track, has a forward thrust owing to the weight of the cradle and also, in the present case, to the action of the spring K, and in order to check this thrust so as to sustain the cradle in its normal or raised position, means are provided to resist the forward movement of the rod, and the gate F is so related to these means and to the rod as to disengage them upon being swung backwardly as indicated by the arrow in Fig. 1. In the present case, said means may be embodied in a nose I formed in the forward end of the rod E and the gate shaft J adapted to be engaged by said nose. The gate itself is formed with a forked boss G for the end of the rod E to rest between and a cross piece or projection H to engage and lift the nose I when the gate is swung back.

With the parts as shown in Fig. 1, the nose I lies immediately in front of and by preference slightly below the center or axis of the gate, thereby holding the cradle in the elevated position and clear of the roadway, the forward thrust, if necessary, being augmented by a spring K which also serves to hold the cradle down hard against the rails when operated. Meeting an obstruction and being free to swing on its center, the gate moves back, as indicated by the arrow. In so doing it immediately raises the end of the rod E over its axis, thereby disturbing the abutment of the nose I and allowing the rod under the weight of the cradle and also under the action of the spring K to move forward and the cradle to fall down quickly to the position shown by dotted lines, ready to receive or pick up the obstruction. When the parts have thus been operated, they will remain in such operating position until they are readjusted or reset. For this purpose any suitable mechanism may be adopted. Preferably, a pair of toggle arms are embodied in the connections between the cradle and the gate, as shown at T in Fig. 7. In the construction shown in this figure, one of the arms is pivoted to the gate shaft by embracing the same freely, while the other arm engages the rod E. When the gate drops, the arms will be thrown out of alinement, as they are illustrated in Fig. 7, and a vertical rod N, which is operatively connected with the toggle and the top of which extends through the floor of the car terminating in a foot plate, will be raised so that the foot plate will project above the floor. When the foot plate is depressed so that it is again flush with the floor, the toggle arms will be pushed back into substantial alinement and will operate upon the rod E to raise the cradle, as will be obvious.

In Fig. 1 a modification of the resetting means is shown, which consists in the provision of a bell crank lever L pivoted to a bracket M, one arm of the bell crank lever bearing against a stud *e* upon the rod E and the other arm of said lever being connected with the lower end of the rod N. Thus, when the rod N is depressed, the rod E will be pushed backward so that the nose upon its end will drop into place in the boss G.

The cradle and gate are preferably formed with metallic frames and wooden cross-bars, but of course such construction is not essential to the invention.

I claim as my invention:

1. The combination of a wheel guard for cars, a member extending upwardly from the guard and out of alinement with the bottom thereof, a gate in advance of the guard, and operative connections between the upwardly extending member and gate including a toggle.

2. The combination of a wheel guard for cars, a gate in advance of the guard, an axle for the gate, and operative connections between the guard and gate including a toggle, one member of which engages the said axle.

3. The combination of a wheel guard for cars, a member extending upwardly from the guard and out of alinement with the bottom thereof, a gate in advance of the guard, operative connections between the said member and gate including a toggle, and a spring secured to the said member to depress the guard when released by the toggle.

4. The combination of a wheel guard for cars, a member extending upwardly from the guard and out of alinement with the bottom thereof, a gate in advance of the guard, operative connections between the upwardly extending member and gate including a toggle, and means to reset the mechanism through the medium of the toggle.

5. The combination of a wheel guard for cars, a gate in advance of the guard, an axle for the gate, operative connections between the guard and gate including a toggle, one member of which engages the said axle, and means to reset the mechanism through the medium of the toggle.

6. The combination of a wheel guard for cars, a gate in advance of the guard, and operative connections between the guard and gate including a pair of horizontally disposed toggle arms arranged between the guard and gate.

7. The combination of a wheel guard for cars, a gate in advance of the guard, operative connections between the guard and gate including a pair of horizontally disposed toggle arms arranged between the guard and gate, and means to reset the mechanism through the medium of the toggle arms.

8. The combination of a wheel guard for cars, a member extending upwardly from the guard and out of alinement with the bottom thereof, a gate in advance of the guard, operative connections between the upwardly extending member and gate including a toggle, and a substantially vertical rod extending through the floor of the car and adapted to reset the mechanism through the medium of the toggle.

9. The combination of a wheel guard for cars, a gate in advance of the guard, operative connections between the guard and gate including a pair of horizontally disposed toggle arms arranged between the guard and gate, and a substantially vertical rod extending through the floor of the car and adapted to reset the mechanism through the medium of the toggle arms.

10. The combination of a wheel guard for cars, a gate in advance of the guard, operative connections between the guard and gate including a toggle, and a substantially vertical resetting rod extending through the floor of the car and operatively related to the toggle so as to be raised when the toggle is bent, the gate being free to move back to its vertical position before the mechanism is reset.

11. In apparatus for preventing accidents or loss of life in connection with tram-cars, motor-cars and other road-vehicles, a pilot-board or like part of a vehicle, a cradle composed of metal bars lagged with wood and a shaft, means for pivoting such shaft to the said pilot board or part, a lever on the said shaft, a gate also composed of metal bars lagged with wood and having a shaft, means for suspending such gate-shaft from the under side of the vehicle, a rod or bar coupled at one end to the said lever and lying upon the gate-shaft at the other, also having a nose or shoulder at such other end normally lying against the gate-shaft, a forked boss fast upon the said gate-shaft with cross-piece lying below the said nose on the rod, and means for resetting the rod when it loses its abutment, as set forth.

12. The combination of a wheel guard for cars, a gate in advance of the guard, and a pair of toggle arms extending backwardly from the gate and operatively connected with the guard.

13. The combination of a wheel guard for cars, a gate in advance of the guard, a pair of toggle arms extending backwardly from the gate and operatively connected with the guard, and means to reset the mechanism through the toggle arms.

14. The combination of a wheel guard for cars, a gate in advance of the guard, a pair of toggle arms extending backwardly from the gate and operatively connected with the guard, and a substantially vertical rod to aline the toggle arms and thus reset the mechanism.

15. The combination of a wheel guard for cars, a gate in advance of the guard, an axle for the gate, and a pair of toggle arms one of which engages the gate axle and the other of which is operatively connected with the guard, said arms extending backwardly from the gate axle so as to lie horizontally between the guard and gate and above the guard.

16. The combination of a wheel guard for cars, a gate in advance of the guard, an axle for the gate, a pair of toggle arms one of which engages the gate axle and the other of which is operatively connected with the guard, said arms extending backwardly from the gate axle so as to lie horizontally between the guard and gate and above the gate, and a substantially vertical rod to aline the toggle arms and thus reset the mechanism.

This specification signed and witnessed this 29th day of June A. D., 1909.

ARTHUR HUDSON.

Signed in the presence of—

ERNALD SIMPSON MOSELEY,

MALCOLM SMETHURST.